United States Patent
Seok

(10) Patent No.: US 8,537,791 B2
(45) Date of Patent: Sep. 17, 2013

(54) METHOD AND APPARATUS FOR CHANNEL ACCESS IN CONTENTION-BASED COMMUNICATION SYSTEM AND STATION

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 13/145,331

(22) PCT Filed: Jan. 18, 2010

(86) PCT No.: PCT/KR2010/000292
§ 371 (c)(1),
(2), (4) Date: Jul. 19, 2011

(87) PCT Pub. No.: WO2010/085069
PCT Pub. Date: Jul. 29, 2010

(65) Prior Publication Data
US 2012/0051338 A1    Mar. 1, 2012

Related U.S. Application Data

(60) Provisional application No. 61/145,953, filed on Jan. 20, 2009.

(51) Int. Cl.
*H04J 3/00* (2006.01)
*H04L 12/413* (2006.01)
*H04L 12/43* (2006.01)

(52) U.S. Cl.
USPC .......................... 370/337; 370/445; 370/458

(58) Field of Classification Search
USPC ........................................................ 370/337
See application file for complete search history.

(56) References Cited

U.S. PATENT DOCUMENTS

| 7,813,385 | B1 * | 10/2010 | Hyun et al. ................. 370/508 |
| 2005/0157747 | A1 | 7/2005 | Yang et al. |
| 2006/0221920 | A1 * | 10/2006 | Gopalakrishnan et al. ... 370/338 |
| 2010/0029222 | A1 * | 2/2010 | Doubchak et al. ............ 455/101 |
| 2010/0130221 | A1 * | 5/2010 | Imamura .................... 455/452.1 |
| 2010/0150077 | A1 * | 6/2010 | Nanda et al. ................. 370/328 |

FOREIGN PATENT DOCUMENTS

| KR | 10-0570830 | 4/2006 |
| KR | 10-2008-0080726 | 9/2008 |
| KR | 10-0891788 | 4/2009 |

* cited by examiner

*Primary Examiner* — Steven H Nguyen
*Assistant Examiner* — Abu-Sayeed Haque
(74) *Attorney, Agent, or Firm* — Lee, Hong, Degerman, Kang & Waimey

(57) ABSTRACT

A method for accessing a channel by a station in a contention-based communication system, includes: starting a backoff timer to perform contention-based channel accessing; when the backoff timer expires, a delay timer starts; and when the delay timer expires, channel accessing is attempted. Coexistence of a station using a directional antenna and a station using a non-directional antenna is guaranteed in a contention-based communication system.

11 Claims, 4 Drawing Sheets

METHOD AND APPARATUS FOR CHANNEL ACCESS IN CONTENTION-BASED COMMUNICATION SYSTEM AND STATION

CROSS-REFERENCE TO RELATED APPLICATIONS

This application is a 371 U.S. national stage application of International Application No. PCT/KR2010/000292, filed on Jan. 18, 2010, which claims priority to U.S. Provisional Application Ser. No. 61/145,953, filed on Jan. 20, 2009, the contents of which are incorporated by reference herein in their entirety.

TECHNICAL FIELD

The present invention relates to wireless communication and, more particularly, to a channel access method and apparatus in a contention-based communication system.

BACKGROUND ART

With the advancement of information communication technologies, various wireless communication technologies have recently been developed. A wireless local access network (WLAN) is a technology whereby super high-speed internet access is possible in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. Initially, WLAN used a frequency of 2.4 GHz to support a data rate of 1 to 2 Mbps by using frequency hopping, spread spectrum, infrared ray communication, etc. Recently, the WLAN can support a data rate of up to 54 Mbps by using orthogonal frequency division multiplexing (OFDM). In addition, the IEEE 802.11 is developing or commercializing standards of various technologies such as quality of service (QoS) improvement, access point (AP) protocol compatibility, security enhancement, radio resource measurement, wireless access in vehicular environments, fast roaming, mesh networks, inter-working with external networks, wireless network management, etc.

The IEEE 802.11b standard supports a data rate of up to 11 Mbps (bits per second) by using a frequency band of 2.4 GHz. The IEEE 802.11a standard uses a frequency band of 5 GHz instead of the frequency band of 2.4 GHz and thus significantly reduces influence of interference. The IEEE 802.11a standard has improved the data rate to up to 54 Mbps by using the OFDM technology. The IEEE 802.11n standard provides increased network speed and reliability, extended coverage.

Basic access mechanism of an IEEE 802.11 is a carrier sense multiple access with collision avoidance (CSMA/CA) combined with binary exponential backoff. The CSMA/CA mechanism is also referred to as a distributed coordinate function (DCF) and basically employs a listen before talk access mechanism. A station (STA) listens to a wireless medium before starting transmission. As a result of listening, if it is sensed that the wireless medium is not in use, the listening STA starts its transmission. Otherwise, if it is sensed that the wireless medium is in use, the STA does not start its transmission but enters a delay duration determined by the binary exponential backoff algorithm.

IEEE 802.11 VHT (Very High Throughput) is one of WLAN systems newly proposed to support throughput of more than 1 Gbps. The VHT is dualized into IEEE 802.11ac using a band of 6 GHz or lower and IEEE 802.11ad using a band of 60 GHz, the two of which are independently (separately) ongoing.

In order to obtain a wider coverage and higher throughput, a directional antenna is introduced to the WLAN system. However, the use of the directional antenna may cause shortcomings that a hidden node problem may aggravate although the coverage is extended.

Thus, a method for effectively operating the CSMA/CA in a system in which a station that uses a directional antenna and a station that uses a non-directional antenna coexist is required.

DISCLOSURE OF INVENTION

Technical Problem

Therefore, an object of the present invention is to provide a channel access method and apparatus in a communication system in which a station using a directional antenna and a station using a non-directional antenna coexist.

Another object of the present invention is to provide a channel access method and apparatus capable of preventing a service delay due to contention in a contention-based communication system.

Solution to Problem

In an aspect, a method for accessing a channel by a station in a contention-based communication system is provided. The method includes starting a backoff timer to perform contention-based channel accessing, when the backoff timer expires, a delay timer starts and when the delay timer expires, channel accessing is attempted.

The value of the delay timer may be smaller than a value obtained by subtracting a transmission time duration of a directional RTS (Request to Send) frame from a transmission time duration of an omni-directional RTS frame.

Attempting of channel accessing may comprise transmitting an RTS frame, the station comprises a directional antenna, and the RTS frame is a directional RTS frame.

The backoff timer may operate based on a slot time determined by an access point, and the slot time is determined by considering a time required for RTS frame transmission, wherein the RTS frame transmission is directional transmission performed by using a directional antenna.

The backoff timer may operate based on a slot time determined by an access point, and the slot time is determined by considering a time required for RTS frame transmission, wherein the RTS frame transmission is omni-directional transmission performed by using an omni-directional antenna.

Advantageous Effects of Invention

Coexistence of a station using a directional antenna and a station using a non-directional antenna can be guaranteed in a contention-based communication system. In addition, the probability of collision between stations using directional antennas can be reduced without an additional increase of slot time.

MODE FOR THE INVENTION

Figure 1:
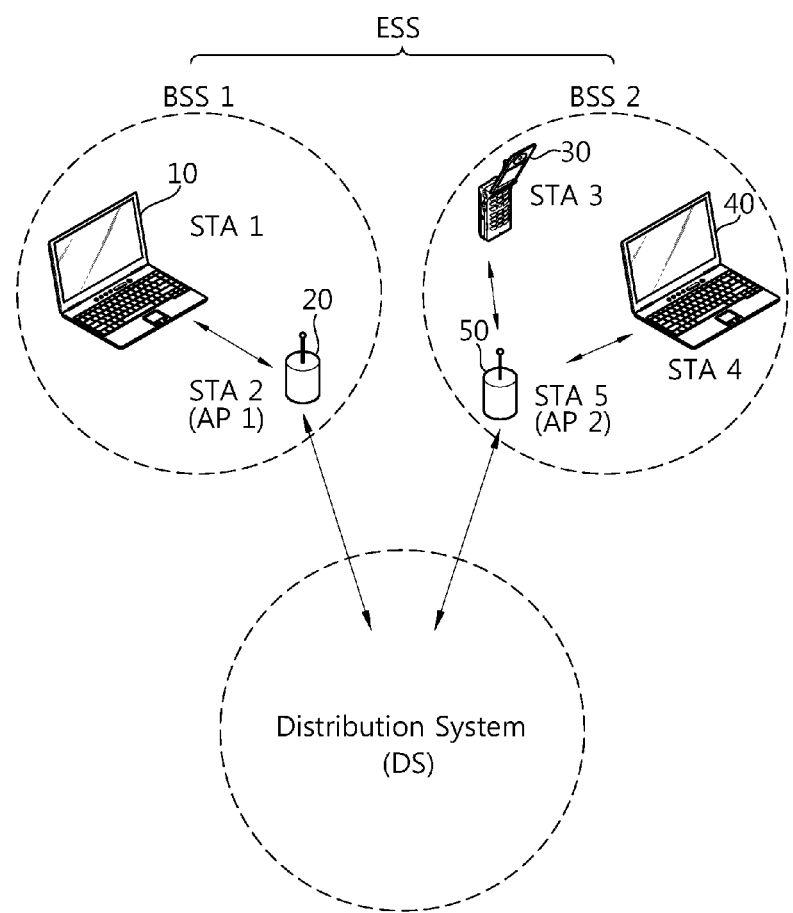
FIG. 1 is a schematic view showing an exemplary structure of a wireless local access network (WLAN) system to implement an embodiment of the present invention.

FIG. 1 is a schematic view showing an exemplary structure of a wireless local access network (WLAN) system to implement an embodiment of the present invention. The WLAN system includes one or more basic service sets (BSSs). The BSS is a set of stations (STAs) which are successfully synchronized to communicate with one another. The BSS can be classified into an infrastructure BSS and an independent BSS (IBSS). The infrastructure BSSs (BSS1 and BSS2) shown in FIG. 1 include STAs 10, 30 and 40, access points (APs) 20 and 50. The AP is a STA providing a distribution service. The APs 20 and 50 are connected by means of a distribution system (DS). The IBSS operates as Ad-hoc mode and does not include any AP. The IBSS constitutes a self-contained network since connection to the DS is not allowed. A plurality of infrastructure BSSs can be interconnected by the use of the DS. An extended service set (ESS) is a plurality of BSSs connected by the use of the DS. In the same ESS, a non-AP STA can move from one BSS to another BSS while performing seamless communication.

The STA is an arbitrary functional medium including a medium access control (MAC) and wireless-medium physical layer (PHY) interface conforming to the institute of electrical and electronics engineers (IEEE) 802.11 standard. The STA may be a AP or a non-AP STA. A non-AP STA may be a portable terminal operated by a user. The non-AP STA may be simply referred to as an STA. The non-AP STA may be referred to as a wireless transmit/receive unit (WTRU), a user equipment (UE), a mobile station (MS), a mobile terminal, a mobile subscriber unit, etc. The AP is a functional entity for providing connection to the DS through a wireless medium for an associated STA. Although communication between non-AP STAs in an infrastructure BSS including the AP is performed via the AP in principle, the non-AP STAs can perform direct communication when a direct link is set up. The AP may be referred to as a centralized controller, a base station (BS), a node-B, a base transceiver system (BTS), a site controller, etc.

An IEEE 802.11 protocol includes a medium access control (MAC) layer and a physical layer. The basic structure of the MAC includes a distributed coordination function (DCF) based on a carrier sense multiple access with collision avoidance (CSMA/CA).

Figure 2:
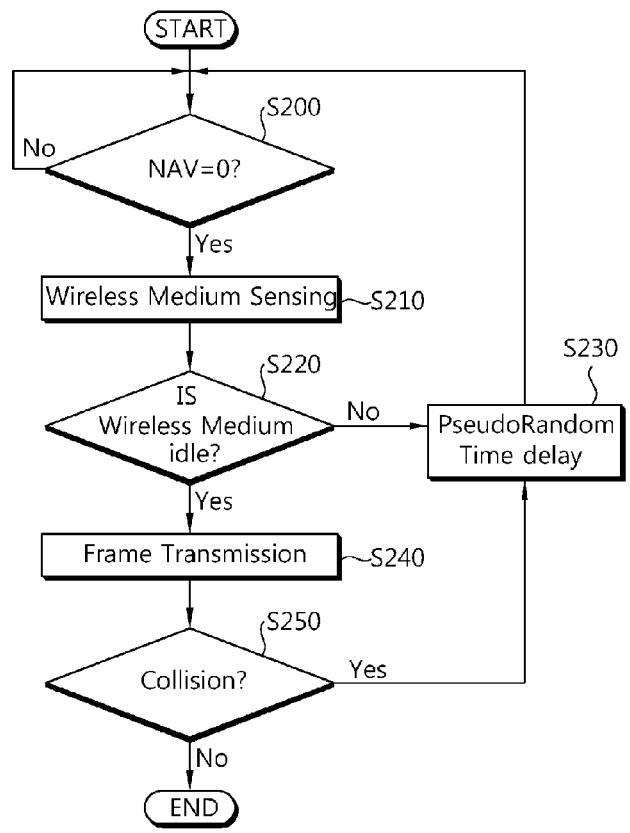
FIG. 2 is a flow chart illustrating the operation of a CSMA/CA.

FIG. 2 is a flow chart illustrating the operation of a CSMA/CA. A station that attempts channel accessing waits until a network allocation vector (NAV) becomes zero (S200). The NAV is a timer indicating time information when a medium has been reserved. The station sets a time duration during which the medium is busy), including every frame required for completing a current operation. Another station waits until the NAV is counted down to zero. If the NAV is not 0, a virtual carrier detection function indicates that the medium is busy, and when the NAV becomes 0, the virtual carrier detection function indicates that the medium is idle.

When the NAV value of the station becomes 0, the wireless medium is sensed (S210) and it is determined whether or not the wireless medium is idle (S220). If the wireless medium is not idle, transmission is delayed during a certain time period (S230). If, however, the wireless medium is idle, a frame transmission is attempted (S240). The frame may be a request to send (RTS) frame. If collision occurs in result of the transmission of the RTS frame, the transmission is delayed again during a certain period of time, and then, channel accessing is attempted again starting from step S200 (S250).

In IEEE 802.11 MAC, an interframe space (IFS) is used to define a minimum time duration during which the station, which wants to perform radio communication, should wait until a next operation upon detecting the idle state of the wireless medium. Various priority levels are provided by the IFSs, and as the IFS value is small, it has a higher priority level.

A short IFS (SIFS) is a time interval until before an ACK (Acknowledgement) or CTS (Clear To Send) frame is transmitted after transmission of one data frame is completed, and provides the highest priority level among IFS. The SIFS has a fixed value according to physical layers in consideration of a time duration with which a station, which has transmitted a data frame, can be put to a state in which it can receive another data frame.

A point (coordination function) IFS (PIFS) is used by an access point (AP) to preferentially obtain the authority to access a medium over the other stations, when it operates as a PCF.

A distributed (coordination function) IFS (DIFS) is used for every station operating as a DCF to transmit data and a management frame. In this case, the data and the management frame are transmitted with a lower priority than the PCF-based transmission.

An extended IFS (EIFS) is used to allow a DCF-based station to have a sufficient time to send an ACK frame to a reception station if there occurs an error in a data frame transmission.

Figure 3:
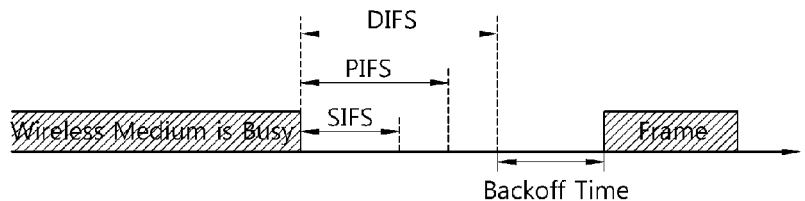
FIG. 3 illustrates the relationship between various types of IFSs used in IEEE 802.11 MAC and the IFSs.

FIG. 3 illustrates the relationship between the various types of IFSs used in IEEE 802.11 MAC and the IFSs. When the wireless medium is currently used by a different station, frame transmission is delayed until when the wireless medium is not in use. When the wireless medium is empted, a pertinent station waits during a corresponding IFS. Subsequent to the IFS, backoff starts. A backoff time for the backoff is defined by Equation 1 shown below:

MathFigure 1

$$\text{Backoff Time} = \text{Random}(\ ) + a\text{SlotTime} \qquad \text{[Math. 1]}$$

Herein, Random( ) is a Pseudo-random integer drawn from a uniform distribution over the interval [0,CW], where CW is an integer within the range of values of the PHY characteristics aCWmin and aCWmax, aCWmin=CW=aCWmax. A slot time (aSlotTime) is a value given according to the characteristics of a physical layer of a station.

Figure 4:
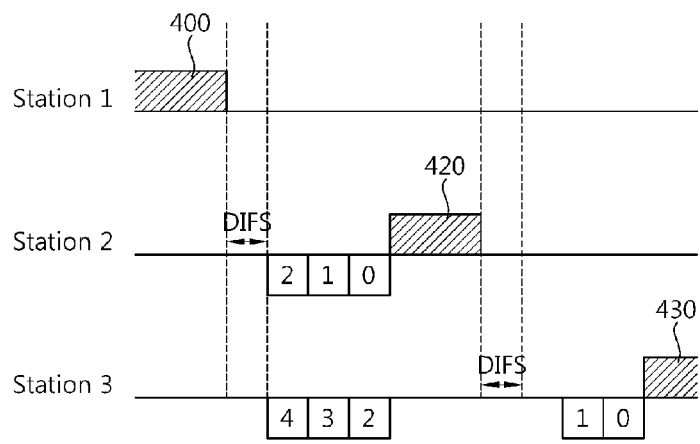
FIG. 4 illustrates a collision avoiding method using random backoff.

FIG. 4 illustrates an aspect of collision avoiding method using random backoff. While a station 1 is transmitting a frame 400, a wireless medium is busy, so stations 2 and 3 set the NAV. If the wireless medium is idle, the stations 2 and 3 generates a backoff time. For example, it is assumed that a backoff time of the station 2 is generated as 2 and that of the station 3 is generated as 4. After DIFS, the stations 2 and 3 reduce their backoff time. If the backoff time of the station 2 becomes 0 before the station 3, the station 2 transmits a frame 420. After the DIFS following the transmission of the frame 420, the station 3 reduces its backoff time, and when the backoff time reaches 0, the station 3 transmits a frame 430.

A VHT system supports three types of antennas: a single antenna, a sector antenna, and a phased-array antenna. The single antenna is a non-steerable antenna that cannot adjust a pattern of propagation, while the sector antenna and the phased array antenna are steerable antennas that can adjust patterns such as the direction or phase of propagation, and the like.

Hereinafter, a station including a non-steerable antenna will be called a non-steerable STA and a station including a steerable antenna will be called a steerable STA. The non-steerable station can perform only omni-directional transmission, while the steerable station can perform directional transmission.

Figure 5:
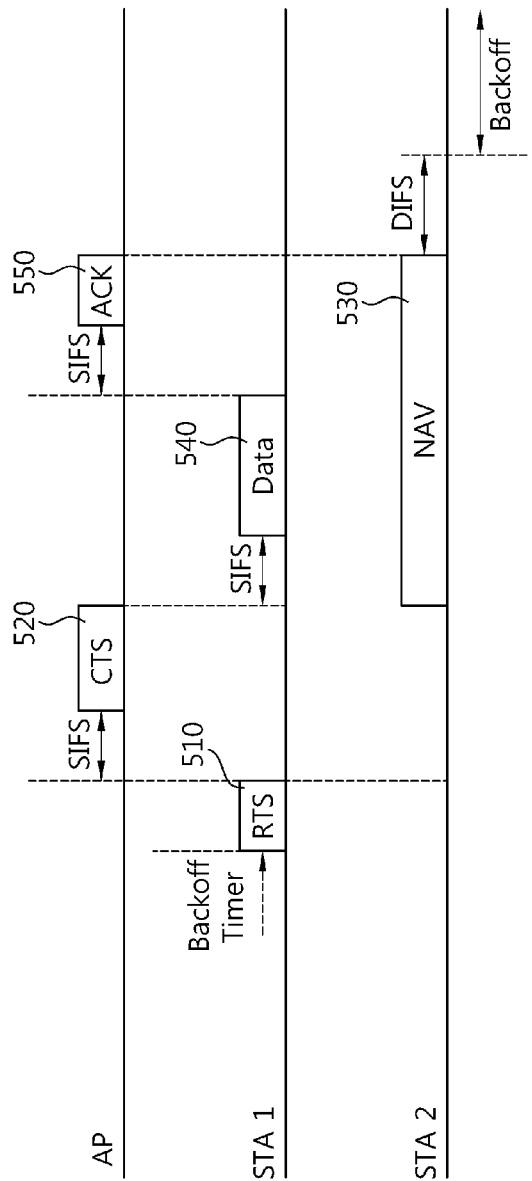
FIG. 5 illustrates a channel access method according to an embodiment of the present invention.

FIG. 5 illustrates a channel access method according to an embodiment of the present invention. The stations 1 and 2 attempt channel accessing through a backoff process during a contention period. When the backoff timer becomes 0, the station 1 transmits a directional RTS frame 510 to an AP through beamforming. The directional RTS frame 510 is a directionally transmitted RTS frame. By comparison, an omni-directional RTS frame is an omni-directionally transmitted RTS frame. In terms of the characteristics of the directional transmission, a transmission interval required for the directional RTS frame 510 to be transmitted may be shorter than a transmission interval for the omni-directional RTS frame to be transmitted. The AP transmits an omni-directional CTS (Clear-To-Send) frame 520 to the stations belonging to a BSS so that they can listen to it. Upon receiving the CTS frame 520, the station 2 sets a NAV 530 and stops channel accessing during a transmission opportunity (TXOP) of the station 1 currently using the wireless medium. The station 1 transmits a data frame 540 and the AP transmits an ACK 550 with respect to the data frame 540. When the TXOP of the station 1 is terminated, backoff is initiated after the lapse of the DIFS.

A backoff time of the steerable station needs to be adjusted. In particular, as the directional transmission is introduced, physical characteristics change, so it is proposed that a slot time be changed in order to reduce a collision probability.

The steerable station may define a slot time (aSlotTime) used in the backoff process, as represented by Equation 2 shown below:

MathFigure 2

$$aSlotTime = aPropDriftMargin + aShortRTSDur + aSIFSTime + aCCATime + aRxTxSwitchTime \quad [\text{Math. 2}]$$

wherein 'aPropDriftMargin' indicates a transmission delay time in consideration of the distance between a station and the AP, 'aShortRTSDur' indicates a transmission time of a directional RTS frame, 'aSIFSTime' indicates an SIFS time, 'aCCATime' indicates time taken for a clear channel assessment (CCA), and 'aRxTxSwitchTime' indicates time taken for a physical media dependent (PMD) sublayer, a lower portion of the MAC, which is in charge of transmitting an RF signal to a different 802.11 station, to be switched from a reception mode to a transmission mode.

However, the slot time of Equation 2 can be hardly applied to a non-steerable station. The reason is because the transmission time duration of the omni-directional RTS frame is longer than the transmission time duration of the directional RTS frame, so the slot time of Equation 2 cannot secure time required for transmitting the omni-directional RTS frame.

Thus, a slot time when a non-steerable station and a steerable station coexist in the BSS may be obtained as represented by Equation 3 shown below:

MathFigure 3

$$aSlotTime = aPropDriftMargin + aLongRTSDur + aSIFSTime + aCsCATime + aRxTxSwitchTime \quad [\text{Math. 3}]$$

wherein 'aLongRTSDur' is a transmission time duration of the omni-directional RTS frame. It becomes a unit of backoff when a non-steerable and a steerable station, which coexist, perform backoff during a contention interval for channel accessing. When the slot time of Equation 2 and that of Equation 3 are compared, the slot time of Equation 2 is longer than that of Equation 3 due to the transmission time duration of the omni-directional RTS frame. In the system in which the non-steerable station and the steerable station coexist, the slot time is larger than the sum of the transmission time duration (aLongRTSDur) of the omni-directional RTS frame, a time duration (aCCATime) required for CCA with respect to an omni-directional CTS frame. And an SIFS time interval (aSIFSTime).

In the system in which the non-steerable station and the steerable station coexist, the stations access channels as follows.

1) After a backoff timer including the slot time defined as represented by Equation 3 expires in the contention interval, each station transmits an RTS frame to the AP to attempt channel accessing.

2) After the backoff timer expires, the non-steerable station immediately transmits the omni-directional RTS frame to the AP.

3) After the backoff timer expires, the steerable station starts the delay timer, and when the delay timer expires, the steerable station transmits the directional RTS frame. When the value of the delay timer is MIFS (Millimeter wave Inter-Frame Space), the MIFS value is $0 \leq MIFS \leq (aLongRTSDur - aShortRTSDur)$. When the MIFS is represented by the unit of 'aShortRTSDur', the MIFS value may be $0 \leq MIFS \leq \{(aLongRTSDur - aShortRTSDur)/aShortRTSDur\}$. The MIFS value may be set to be smaller than a value obtained by subtracting the transmission time duration of the directional RTS frame from the transmission time duration of the omni-directional RTS frame.

The MIFS can reduce the probability of collision between directional RTS frames transmitted by each steerable station. When a backoff timer (or a first timer) of each steerable station expires, each steerable station starts the delay timer (or a second timer), and when the delay timer expires, each steerable station then transmits the directional RTS frame to the AP.

Figure 6:
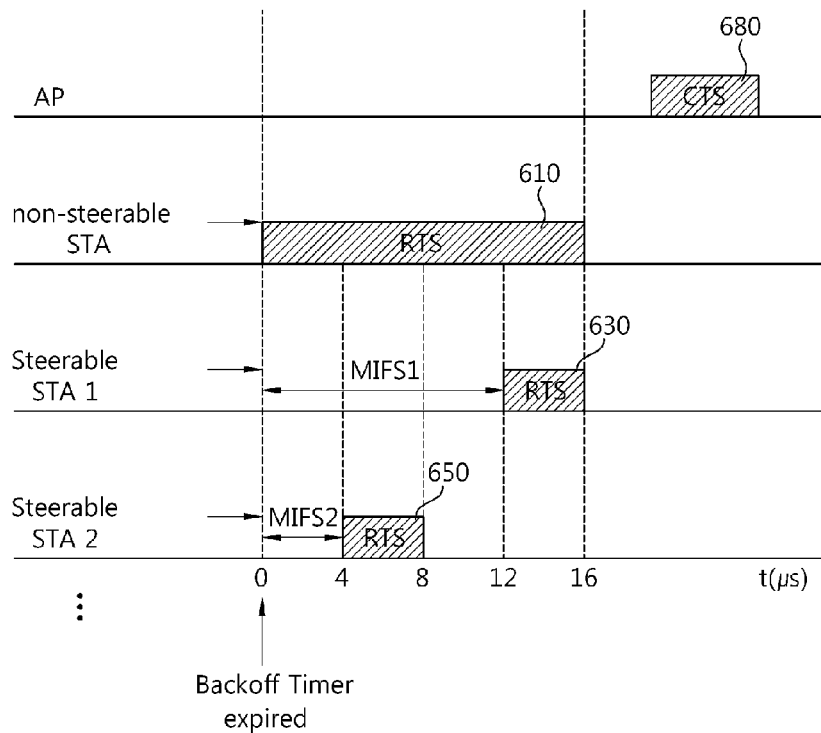
FIG. 6 illustrates a channel access method according to an embodiment of the present invention.

FIG. 6 illustrates a channel access method according to an embodiment of the present invention. To clarify explanation, it is assumed that the system includes a non-steerable station and steerable stations 1 and 2, slot time is defined as represented by Equation 3, and parameter values are as shown in Table shown below:

TABLE 1

| Characteristic | Value |
| --- | --- |
| aSlotTime | 26 μs |
| aShortRTSDur | 4 μs |
| aLongRTSDur | 16 μs |
| aLongCTSDur | 16 μs |
| aCCATime | 8 μs |
| aSIFSTime | 2 μs |
| aPropDriftMargin | 0 μs |
| aRxTxSwitchTime | 0 μs |

With reference to above Table, it is assumed that the MIFS has a value ranging from 0 to 12, and an MIFS 1, namely, an MIFS of the steerable station 1, has a value 12 and an MIFS2, namely, an MIFS of the steerable station 2, has a value 4.

It is also assumed that the backoff timers of the non-steerable station and the steerable stations 1 and 2 expire simultaneously. When the backoff timer of the non-steerable station expires, the non-steerable station immediately transmits an omni-directional RTS frame 610 to the AP. After the backoff timer of the steerable station 1 expires, the steerable station 1 transmits a directional RTS frame 630 to the AP after time as long as the MIFS 1 is delayed. After the backoff timer of the steerable station 2 expires, the steerable station 2 transmits a directional RTS frame 650 to the AP after time as long as the MIFS2 is delayed.

Upon receiving the omni-directional RTC frame 610, the directional RTS frame 630, and/or the directional RTS frame 650, the AP transmits an omni-directional CTS frame 680.

Within the range of the transmission time of the omni-directional RTS frame 610 of the non-steerable station, the steerable stations may send the directional RTS frames at each different time. Accordingly, the coexistence of the non-steerable station and the steerable stations is guaranteed, and the probability of collision between the steerable stations can be lowered.

Figure 7:
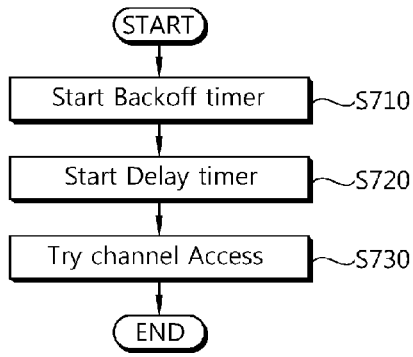
FIG. 7 is a flow chart illustrating a channel access method according to an exemplary embodiment of the present invention.

FIG. 7 is a flow chart illustrating a channel access method according to an exemplary embodiment of the present invention. This method may be performed by the steerable station. In order to start a backoff process, the station starts its backoff timer to perform contention-based channel accessing (S710). The backoff timer may be defined as represented by Equation 1, and the slot time may be defined as represented by Equation 3. When the backoff timer expires, the station starts the delay timer (S720). The MIFS, namely, the value of the delay timer, may be set to be smaller than the value obtained by subtracting the transmission time duration of the directional RTS frame from the transmission time duration of the omni-directional RTS frame. The MIFS may be a time duration used for backoff of the directional RTS frame while the omni-directional RTS frame is transmitted. When the delay timer expires, the station attempts channel accessing (S730). The station may transmit the directional RTS frame to the AP, for the channel accessing.

Figure 8:
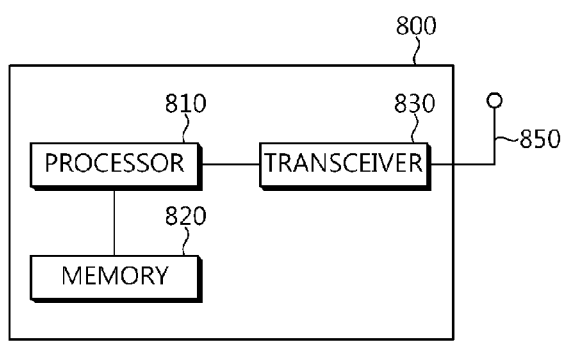
FIG. 8 is a schematic block diagram of a station according to an embodiment of the present invention.

FIG. 8 is a schematic block diagram of a station according to an embodiment of the present invention. A station 800 includes a processor 800, a memory 820, a transceiver 830, and a directional antenna 850. The transceiver 830 transmits/receives a radio signal and implements an IEEE 802 physical layer. The transceiver 830 supports a directional transmission through the directional antenna 830. The processor 810 is connected to the transceiver 830 to implement an IEEE 802 MAC layer. The processor 810 may implement a method for accessing a channel to the above-mentioned AP.

The processor 810 and/or the transceiver 830 may include an application-specific integrated circuit (ASIC), a chip set, a logical circuit, and/or a data processing unit. The memory 820 may include a ROM (Read-Only Memory), a RAM (Random Access Memory), a flash memory, a memory card, a storage medium, and/or other storages. When an embodiment is implemented by software, the above-described scheme may be implemented as a module (process, function, etc.) that performs the above-described functions. The module may be stored in the memory 820 and executed by the processor 810. The memory 820 may be within or outside the processor 810, and connected to the processor 810 via various well-known units.

In the exemplary system as described above, the methods are described based on the flow chart including the sequential steps or blocks, but the present invention is not limited to the order of the steps, and some steps may be sequentially or simultaneously performed with another steps in a different order or sequence. Also, it would be obvious for the skilled person in the art that the steps shown in the flow cart are not exclusive, to which a different step may be included, or one or more steps of the flow chart may be deleted without affecting the scope of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A method for accessing a channel by a station in a contention-based communication system, the method comprising:
    starting a backoff timer to perform contention-based channel accessing;
    starting a delay timer when the backoff timer expires, wherein a specific value for the delay timer is smaller than a value obtained by subtracting a transmission time duration of a directional RTS (Request To Send) frame from a transmission time duration of an omni-directional RTS frame; and
    attempting the contention-based channel accessing when the delay timer expires.

2. The method of claim 1, wherein attempting the contention-based channel accessing comprises transmitting a directional RTS frame.

3. The method of claim 1, wherein the backoff timer operates based on a slot time determined by an access point, and the slot time is determined by considering a time required for RTS frame transmission, wherein the RTS frame transmission is directional transmission performed by using a directional antenna.

4. The method of claim 1, wherein the backoff timer operates based on a slot time determined by an access point, and the slot time is determined by considering a time required for RTS frame transmission, wherein the RTS frame transmission is omni-directional transmission performed by using an omni-directional antenna.

5. A station in a contention-based communication system, the station comprising:
    a transceiver that transmits or receives a radio signal; and
    a processor connected to the transceiver, the processor configured to:
        start a backoff timer to perform contention-based channel accessing,
        start a delay timer when the backoff timer expires, wherein a specific value for the delay timer is smaller than a value obtained by subtracting a transmission time duration of a directional RTS (Request To Send) frame from a transmission time duration of an omni-directional RTS frame, and
        attempt the contention-based channel accessing when the delay timer expires.

6. The station of claim 5, further comprising:
    a directional antenna connected to the transceiver, wherein the contention-based channel accessing is performed by transmitting a directional RTS frame.

7. A channel accessing method in a contention-based communication system, the method comprising:
    starting a backoff timer to perform contention-based channel accessing;
    attempting, by a non-steerable station, the contention-based channel accessing when the backoff timer expires, and
    starting, by a steerable station, a delay timer; and attempting, by the non-steerable station, the contention-based channel accessing when the delay timer expires, wherein a specific value for the delay timer is smaller than a value obtained by subtracting a transmission time duration of a directional RTS (Request To Send) frame from a transmission time duration of an omni-directional RTS frame.

8. The station of claim 5, wherein the backoff timer operates based on a slot time determined by an access point, and the slot time is determined by considering a time required for RTS frame transmission, wherein the RTS frame transmission is directional transmission performed by using a directional antenna.

9. The station of claim 5, wherein the backoff timer operates based on a slot time determined by an access point, and the slot time is determined by considering a time required for RTS frame transmission, wherein the RTS frame transmission is omni-directional transmission performed by using an omni-directional antenna.

10. The channel accessing method of claim 7, wherein the backoff timer operates based on a slot time determined by an access point, and the slot time is determined by considering a time required for RTS frame transmission, wherein the RTS frame transmission is directional transmission.

11. The channel accessing method of claim 7, wherein the backoff timer operates based on a slot time determined by an access point, and the slot time is determined by considering a time required for RTS frame transmission, wherein the RTS frame transmission is omni-directional transmission.

* * * * *